Patented Feb. 5, 1946

2,394,439

UNITED STATES PATENT OFFICE 2,394,439

CELLULOSE ESTER COMPOSITION

Rudolph M. Goepp, Jr., New Castle, Del., assignor to Atlas Powder Company, Wilmington, Del., a corporation of Delaware No Drawing. Application March 12, 1945, Serial No. 582,422

7 Claims. (Cl. 106—176)

The present invention relates to improvements in cellulose ester compositions.

An object of the invention is to provide new and useful plastic compositions of esters of cellulose and saturated straight-chain fatty acids with from 2 to 4 carbon atoms.

Other objects will become apparent in the course of the following description.

In accordance with the present invention, it has been found that cellulose esters of saturated straight-chain fatty acids with from 2 to 4 carbon atoms, for example cellulose acetate, cellulose propionate, cellulose acetate butyrate, etc., can be plasticized to yield useful compositions by incorporating with them a hexide diester, the acyl radicals of which are selected from the group consisting of the acyl radicals of the saturated straight-chain fatty acids with 2 to 4 carbon atoms. Examples of suitable hexide diesters are sorbide diacetate, sorbide dipropionate, sorbide dibutyrate, isomannide dibutyrate, sorbide butyrate acetate, and mannide butyrate propionate. These hexide diesters exhibit a wide range of compatibility with the cellulose esters and have low volatilities. The compositions made from the cellulose esters and the hexide diesters are suitable for use in the preparation of coating compositions, sheets, filaments, formed bodies, molding compositions, and the like.

The hexides are dihydric compounds with two oxygen-containing rings and having the empirical formula $C_6H_{10}O_4$. They are commercially derived from the hexitols by an anhydridizing reaction, in consequence of which the hexides are named by reference to the hexitols from which they can be formed, by changing the suffix *itol* to *ide*. Thus, mann*itol* yields mann*ide*, sorb*itol* yields sorb*ide*, dulc*itol* yields dulc*ide*, etc. Each of the hexitols is capable of forming a number of isomeric hexides. In this application, the terms "mannide," "sorbide," etc., are employed in the generic sense to cover all isomeric hexides formed from the respective hexitols.

The esters of the invention can be prepared by reacting the hexide with at least two equivalents of the fatty acid or acid anhydride in the presence of an esterifying catalyst, such as sulfuric acid, and/or by refluxing with a water-removing liquid. Instead of using the acid or acid anhydride, the esters can be formed by esterification employing the acid chloride, in which case the reaction is carried out in the presence of alkaline materials as is well understood in the art.

Where mixed esters, for example sorbide butyrate acetate, are to be made, it is preferable to form the monoester of the longer chain acid first and then complete the esterification with the shorter chain acid.

It is also possible to prepare the ester by reacting a hexitol or a hexitan with the fatty acid at elevated temperature in the presence of a catalyst such as sulfuric acid for a time sufficient to remove water from the hexitol or hexitan to form the hexide and simultaneously cause esterification with the fatty acid.

The following examples are illustrative of typical preparations of the esters of the type employed in this invention.

EXAMPLE I

Isomannide dibutyrate 146 grams crystalline isomannide, 190 grams butyric acid, 150 ml. toluene, and C. 5 ml. concentrated sulfuric acid were heated together with continuous agitation. The water formed was removed as a constant boiling mixture with the toluene. Reaction was continued until no further evolution of water was noted at which time 35.5 ml. of water had been collected (calculated 36 ml. water).

The reaction product was then washed with sodium carbonate solution until the excess acid was removed, followed by a water wash to remove the sodium carbonate.

After evaporating the toluene under vacuum 256 grams of product were obtained having a hydroxyl number of 0 and a saponification value of 355.

This product was 100% compatible with cellulose acetate, polyvinyl acetate, polyvinyl chloride, polyvinyl chloride-acetate, and polyvinyl butyral. In a volatility test it had a weight loss of 9% after being held for 120 hours at 105° C.

EXAMPLE II

Sorbide di-butyrate 375 grams crystalline sorbitol, 370 grams butyric acid, 1 ml. concentrated sulfuric acid and 200 ml. toluene were heated together with agitation. The water formed in the reaction was removed as a constant boiling mixture with toluene.

After removing the toluene there remained 415 grams of product which was an oily liquid. The ester had a bitter, slightly sour taste. 100 grams of water at 25° C. dissolve 0.4 gram of the ester.

The other esters of the invention can be made by similar processes using the selected acid or acids and hexide, hexitol or hexitan.

The compositions of the invention can be made by combining the hexide diester and the cellulose ester by the usual compounding methods such as by milling the ingredients together or by dissolving them in mutual solvents. The hexide esters are compatible with the cellulose esters over a wide range of proportions, many of the combinations being miscible in all proportions, thus giving the formulator a range of plastic compositions from which to select the most suitable for a given purpose. Instead of using single hexide esters as plasticizers, mixtures of two or more can be used. Also, mixtures of one or more of these hexide esters with conventional plasticizers offer advantages for some uses.

The following example illustrates a series of plastic compositions made from cellulose acetate and hexide diesters of the type herein defined.

EXAMPLE A

A stock solution was prepared of cellulose acetate (52% acetyl) 16.65 grams in a solvent mixture composed of acetone 20.85 grams, cyclohexanone 20.85 grams, ethyl acetate 16.65 grams, ethyl lactate 12.53 grams, and toluol 12.53 grams. Tests were made by dissolving 2.77 grams of the hexide esters to be tested in 50 parts of this stock solution. The resulting solution was then cast on a glass plate by means of a doctor blade. The plate and film were dried at 55° C. for 12 hours. Following this drying, the films, now composed of cellulose acetate plus 33⅓% of the hexide diester, were stripped off the plate and cut into strips one-half inch wide. Before testing, the strips were conditioned at 70° F. and 65% relative humidity for 12 hours. Tensile strength and elongation measurements were then made on the plasticized strips. The results of these measurements are reported below in the table.

Table A

| Plasticizer | Tensile strength, lbs./inch² | Per cent elongation | Per cent compatible |
| --- | --- | --- | --- |
| Sorbide diacetate | 6,600 | 36 | 100 |
| Sorbide dipropionate | 6,500 | 50 | 100 |
| Isomannide dibutyrate | 5,600 | 40 | 100 |
| Sorbide butyrate acetate | 7,500 | 55 | 100 |

The properties of the plastic compositions can be modified by changing the proportion of plasticizer, as will be understood by those familiar with this art. The other plastic compositions of the invention can be prepared in a similar manner, the above specific examples being given merely by way of illustration.

It is to be noted that it is not necessary to use the hexide diester in a pure form, since commercial mixtures, which often contain related esters as by-products, are preferable for many uses to pure chemical individuals.

What is claimed is:

1. A plastic composition comprising a cellulose ester of a saturated straight-chain fatty acid with from 2 to 4 carbon atoms and as a plasticizer therefor a hexide diester the acyl radicals of which are selected from the group consisting of the acyl radicals of acetic, propionic and butyric acids.

2. A plastic composition comprising cellulose acetate and as a plasticizer therefor a hexide diester the acyl radicals of which are selected from the group consisting of the acyl radicals of acetic, propionic and butyric acids.

3. A plastic composition comprising cellulose acetate-butyrate and as a plasticizer therefor a hexide diester the acyl radicals of which are selected from the group consisting of the acyl radicals of acetic, propionic and butyric acids.

4. A plastic composition comprising cellulose acetate and as a plasticizer therefor a hexide butyrate-acetate.

5. A plastic composition comprising cellulose acetate and as a plasticizer therefor sorbide butyrate-acetate.

6. A plastic composition comprising a cellulose ester of a saturated straight-chain fatty acid with from 2 to 4 carbon atoms and as a plasticizer therefor a mannide diester the acyl radicals of which are selected from the group consisting of the acyl radicals of acetic, propionic and butyric acids.

7. A plastic composition comprising a cellulose ester of a saturated straight-chain fatty acid with from 2 to 4 carbon atoms and as a plasticizer therefor a sorbide diester the acyl radicals of which are selected from the group consisting of the acyl radicals of acetic, propionic and butyric acids.

RUDOLPH M. GOEPP, JR.